United States Patent [19]

Sandstrom

[11] Patent Number: 5,988,248
[45] Date of Patent: Nov. 23, 1999

[54] TIRE WITH RUBBER SIDEWALL

[75] Inventor: Paul Harry Sandstrom, Tallmadge, Ohio

[73] Assignee: The Goodyear Tire & Rubber Company, Akron, Ohio

[21] Appl. No.: 08/806,576

[22] Filed: Feb. 25, 1997

[51] Int. Cl.[6] ..................................................... B60C 13/04
[52] U.S. Cl. ................... 152/524; 152/525; 152/DIG. 12
[58] Field of Search ..................... 152/524, 525, 152/DIG. 12; 525/236, 237

[56] References Cited

U.S. PATENT DOCUMENTS

| | | | |
|---|---|---|---|
| 4,224,196 | 9/1980 | Gursky | 152/525 |
| 5,124,390 | 6/1992 | Miller et al. | 152/524 |
| 5,386,865 | 2/1995 | Sandstrom et al. | 152/525 |

FOREIGN PATENT DOCUMENTS 60-197749  10/1985  Japan .

*Primary Examiner*—Geoffrey L. Knable
*Attorney, Agent, or Firm*—Henry C Young Jr

[57] ABSTRACT

A pneumatic rubber tire having a rubber sidewall with at least a portion of its outer surface being composed of white rubber devoid of carbon black reinforcement and composed of an elastomer composition which contains a combination of trans 1,4-polybutadiene and synthetic cis 1,4-polyisoprene rubber and an exclusion of, or substantial exclusion of, natural cis 1,4-polyisoprene rubber.

10 Claims, No Drawings

TIRE WITH RUBBER SIDEWALL

FIELD

This invention relates to a pneumatic rubber tire having a rubber sidewall of which a portion of its outer surface is a white rubber composition.

BACKGROUND

Pneumatic rubber tires conventionally have rubber sidewalls composed of carbon black reinforced rubber compositions which are, therefore, black in color.

Sometimes it is desired to provide a decorative white colored rubber composition on a portion of an outer surface of such tire sidewall. Such rubber composition is conventionally colored white with titanium dioxide pigment and is devoid of, or does not contain, carbon black.

Sidewalls of rubber tires may age somewhat prematurely due to (i) weathering due to atmospheric conditions such as, for example, exposure to ultraviolet light, ozone and high humidity, (ii) fatigue cracking due to continual flexing of the tire sidewall under operating conditions and (iii) abrasion due to scuffing against road curbs or other objects.

White colored tire sidewalls are of special consideration because, (ii) due to the white color of the sidewalls, the weathering, fatigue cracking and abrasion may be more cosmetically observable than for black colored sidewalls and (ii) due to the absence of carbon black reinforcement the white rubber composition (a) before curing has a lower viscosity and, therefore, is a softer composition to process in rubber mixing and extrusion equipment and, also, has a greater tendency to flow which can be a problem for a manufactured article, prior to curing and (b) after curing typically has less abrasion resistance to scuffing.

In practice, for white sidewalls, weathering is typically retarded by (i) use of antidegradants and, sometimes, the use of low unsaturation rubbers such as, for example, halobutyl rubber—particularly chlorobutyl rubber, and EPDM's, in the rubber composition in the white sidewall rubber composition. EPDM rubbers are well known to those skilled in such art and, generally, mean ethylene/propylene terpolymer elastomers, with a minor amount of non-conjugated diene (e.g. 2 to 15 percent of the terpolymer).

Natural cis 1,4-cis polyisoprene rubber is sometimes used in white sidewall rubber compositions in order to enhance green strength of the uncured rubber composition as well as its building tack and to aid in the processing of the uncured rubber composition during a relatively low shear mixing process typically experienced in mixing the white sidewall rubber composition.

For some white sidewall applications, it is desired to use synthetic cis 1,4-polyisoprene rubber instead of natural cis 1,4-polyisoprene rubber in the white sidewall rubber composition which is, as hereinbefore described, devoid of carbon black reinforcement. While motivation for such substitution may be for a multiple of reasons ranging from (i) concern about visible impurities in natural rubber such as, for example, minor amounts of fiber and dirt impurities from the rubber tree plantation source of the natural rubber to (ii) occasional increased cost considerations for natural rubber as compared to synthetic natural rubber. The fact that the white sidewall rubber is devoid of carbon black reinforcement may also be a motivation because, as hereinbefore discussed, without the carbon black reinforcement, the white sidewall composition is relatively soft and, therefore, processes differently in mixing and extrusion and typically has less green strength and, therefore, has a greater tendency to flow prior to curing.

However, synthetic natural rubber normally provides less toughness, abrasion resistance and fatigue-to-failure time, than natural rubber for such a white rubber sidewall composition.

Accordingly, it is an aspect of this invention to enable a satisfactory substitution of synthetic cis 1,4-polyisoprene rubber for at least a portion of natural cis 1,4-polyisoprene in a white sidewall rubber composition.

As will be hereinafter described, such substitution is accomplished by use of a combination of synthetic cis 1,4-polyisoprene rubber and trans 1,4-polybutadiene rubber.

It should be pointed out that it has relatively recently been proposed to use trans 1,4-polybutadiene rubber in tire sidewall compositions, particularly in carbon black reinforced rubber compositions, in order to increase resistance to flex fatigue and tear initiation and/or increase resistance to cut growth.

Considerations of such suggestions of use of trans 1,4-polybutadiene in tire sidewall composition may be found, for example, in U.S. Pat. No. 5,386,865.

However, it is not known to the inventor where trans 1,4-polybutadiene rubber is used in a white sidewall rubber composition devoid of carbon black reinforcement where it is desired that the rubber composition contains natural rubber but where a combination of trans 1,4-polybutadiene polymer and synthetic cis 1,4-polyisoprene is used to an exclusion, or substantial exclusion, of natural cis 1,4-polyisoprene rubber.

DISCLOSURE AND PRACTICE OF THE INVENTION

In accordance with this invention, a pneumatic rubber tire is provided having a rubber sidewall composed of a carbon black reinforced rubber composition wherein said sidewall also has, as at least a portion of its outer surface, a white rubber composition devoid of carbon black reinforcement, wherein said white sidewall composition is characterized by being comprised of, based on 100 parts by weight rubber (phr), (1) a combination of (A) about 5 to about 30, alternatively about 5 to about 20, phr, of a trans 1,4-polybutadiene polymer, (B) about 10 to about 50, alternatively about 25 to about 45, phr of cis 1,4-polyisoprene rubber(s) composed of 55 to 100, alternatively 70 to 90 weight percent synthetic cis 1,4-polyisoprene rubber and, correspondingly from zero to 45, alternatively from 10 to about 30 weight percent natural cis 1,4-polyisoprene rubber, (C) about 40 to about 70, alternatively about 45 to about 65, phr of chlorobutyl rubber and (D) about 2 to about 15, alternatively about 3 to about 10, phr of EPDM as a terpolymer rubber of about 70 to about 25 percent units derived from ethylene, about 28 to about 75 percent units derived from propylene and about 2 to about 15 percent units derived from a non-conjugated diene and (2) about 10 to about 55 phr of titanium dioxide; wherein said trans 1,4-polybutadiene polymer is characterized by having at least a 70 percent trans 1,4-content and at least one melting point within a range of 20° C. to 60° C.

In one aspect of the invention, said white rubber composition may contain at least one additional rubber in an amount of about 2 to about 15 phr selected from at least one of cis 1,4-polybutadiene rubber, styrene/butadiene copolymer rubber, isoprene/butadiene copolymer rubber and styrene/isoprene/butadiene terpolymer rubber.

In another aspect of the invention, the white sidewall composition may contain about 2.5 to about 15 phr of silica, preferably precipitated silica. If such silica is used, it may also be accompanied by a silica coupler which conventionally has a moiety reactive with silanol groups on the silica surface and another moiety interactive with at least one elastomer in the white sidewall composition.

Significantly, the white sidewall rubber composition is required to be composed of four specified elastomers in specified amounts, namely, the trans 1,4-polybutadiene with its specified Tg and microstructure, the synthetic cis 1,4-polyisoprene rubber, the chlorobutyl rubber and the EPDM rubber. Also significantly, while the rubber composition can optionally contain a fifth elastomer, namely the natural cis 1,4-polyisoprene rubber, so long as it is in the minority insofar as the overall cis 1,4-polyisoprene rubber(s) is(are) concerned.

Thus, in one aspect, the combination of specified, microstructure characterized, trans 1,4-polybutadiene and synthetic cis 1,4-polyisoprene rubber is designed to play a significant role in providing properties similar to or better than the properties typically imparted by natural cis 1,4-polyisoprene rubber and to thereby enable the replacement of, or the substantial replacement of, natural cis 1,4 polyisoprene for a white sidewall composition.

It is important to appreciate that the significance of utilization of the trans 1,4-polybutadiene in the white sidewall rubber composition, where it is desired for the composition to contain natural rubber, is to enable the replacement of natural cis 1,4-polyisoprene rubber yet provide the toughness, abrasion resistance and fatigue-to-failure properties that natural cis 1,4-polyisoprene rubber, when used, conventionally imparts to a white sidewall rubber composition (devoid of carbon black reinforcement).

Preferably, such trans 1,4-polybutadiene is characterized by having a microstructure of about 75 to about an 85 percent of its butadiene repeat units of a trans 1,4-isomeric structure, about 2 to about 18 percent of its units of a vinyl 1,2-structure and about 2 to about 18 percent of its units of a cis 1,4-structure and, in its uncured state, and typically at least one melting point in a range of 20° C. to about 60° C. In one aspect, a preferred trans 1,4-polybutadiene polymer exhibits two melting points, namely, a first major melting point in a range of about 35° C. to about 45° C. and a second minor melting point in a range of about 55° C. to about 65° C. It is believed that the said first major melting point is a more significant characterization of the trans 1,4-polybutadiene polymer and that the said minor melting point may sometimes be practically non-existent.

The trans 1,4-polybutadiene utilized by this invention might be prepared, for example, by anionic polymerization by batch or continuous polymerization of 1,3-butadiene in an organic solvent and in the presence of cobalt octoate and triethyl aluminum as a catalyst system with a para alkyl substituted phenol as a catalyst modifier.

For the purposes of this description, the "compounded" rubber compositions refer to the respective rubber compositions which have been compounded with appropriate compounding ingredients such as, for example, carbon black, oil, stearic acid, zinc oxide, silica, wax, antidegradants, resin(s), sulfur and accelerator(s).

It is readily understood by those having skill in the art that the rubber compositions of the sidewall would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants, reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical utilization of titanium dioxide for imparting a significantly white color to a white sidewall rubber composition may comprise about 10 to 55 parts by weight per 100 parts by weight of diene rubber (phr), alternatively about 15 to about 45 phr. It is recognized that typical use of conventional amounts of zinc oxide in the rubber composition also adds a somewhat white color to the rubber composition but not normally the relatively more brilliant white imparted by the titanium dioxide. The titanium dioxide is not considered to be a rubber reinforcing pigment, at least not in the same sense as rubber reinforcing carbon black.

If desired, as hereinbefore discussed, about 2.5 to about 15 phr of silica can be included in the white sidewall rubber composition, optionally together with a silica coupler.

While commonly employed siliceous pigments used in rubber compounding applications can be used as the silica in this invention, including pyrogenic and precipitated siliceous (silica), precipitated silicas are preferred.

Thus, the siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of The American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc with, for example, designations Zeosil 1165MP and silicas designations VN2 and VN3, etc.

While, in the practice of this invention, various silica couplers can be used. Such couplers often contain a silane moiety for reaction with silanol groups associated with the silica and another, polysulfide, moiety to interact with at least one of the elastomers in the white sidewall composition. For example, a bis-3-(trialkoxysilylalkyl) polysulfide or bis-3-(trialkoxysilylaryl) polysulfide might be used in which its polysulfide bridge contains about 2 to about 6 sulfur atoms. A preferred coupler is a bis-3-(trialkoxysilylalkyl) polysulfide containing from about 2 to about 8 sulfur atoms in the polysulfide bridge as hereinbefore described. For example, the silica coupler can be bis-3-(triethoxysilylpropyl) tetrasulfide.

Typical amounts of tackifier resins, if used, may comprise about 0.5 to about 10 phr, usually about 1 to about 5 phr. Typical amounts of processing aids may comprise 1 to 20 phr. Such processing aids can include, for example, non staining rubber processing oils. Silica, if used, may be used in an amount of about 5 to about 25 phr, with or without a silica coupling agent. The philosophy of utilization of silica coupling agents to couple precipitated silica to diene-based elastomers for elastomer reinforcing purposes is well known to those having skill in such art. Representative silicas may be, for example, hydrated amorphous silicas, particularly precipitated silicas. Typical amounts of antioxidants comprise about 1 to about 5 phr. Representative antioxidants are, for example, non-staining antioxidants such as phenolic antioxidants as would be well known to those skilled in such art. Various antioxidants for use in rubber compositions are disclosed in the *Vanderbilt Rubber Handbook* (1978), including pages 344–346. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. The presence and relative amounts of the above additives are considered to be not an aspect of the present invention which is more primarily directed to the utilization of the aforesaid specified blends of rubbers, specifically including the combination of the trans 1,4-polybutadiene and synthetic cis 1,4-polyisoprene rubber in white tire sidewall compositions.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 2.0 phr, with a range of from about 0.5 to about 1.5 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators which the primary accelerator is generally used in the larger amount (0.5 to 2 phr), and a secondary accelerator which is generally used in smaller amounts (0.05–0.50 phr), in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

Sometimes, the combination of zinc oxide, fatty acid, and accelerator(s) may be collectively referred to as "curing aids".

Sometimes a combination of antioxidants and waxes may be collectively referred to as "antidegradants".

The presence and relative amounts of rubber compounding ingredients are not considered to be an aspect of this invention which is more primarily directed to the utilization of the aforesaid specified blends of rubbers in white tire sidewall compositions, particularly the inclusion of the trans 1,4-polybutadiene together with synthetic cis 1,4-polyisoprene rubber, and to an exclusion, or substantial exclusion of, natural cis 1,4 polyisoprene rubber, in the white sidewall rubber composition.

The tire can be built, shaped, molded and cured by various methods which will be readily apparent to those having skill in such art.

The prepared tire of this invention is conventionally shaped and cured by methods known to those having skill in such art.

The invention may be better understood by reference to the following example in which the parts and percentages are by weight unless otherwise indicated.

EXAMPLE I

White colored mixtures of diene rubbers, devoid of carbon black reinforcement, with relatively small amounts of trans 1,4-polybutadiene having two softening points, namely a major softening point of about 40° C. and a minor softening point of about 60° C., together with synthetic cis 1,4-polyisoprene rubber, were prepared comprised of the following recipe shown in Table 1 as Experiments A, B and C (Exp A, Exp B and Exp C, respectively).

Experiment A is considered a control and contains natural cis 1,4-polyisoprene rubber. The rubber composition B contained synthetic cis 1,4-polyisoprene rubber to the exclusion of natural cis 1,4-polyisoprene rubber. Rubber composition C contained a combination of trans 1,4-polybutadiene polymer and synthetic cis 1,4-polyisoprene rubber to the exclusion of natural cis 1,4-polyisoprene rubber.

The recipe for Experiments A, B and C was, basically of the ingredients shown in the following Table 1, where Table 1A is the initial non-productive mixing stage in an internal rubber mixer for about 4 minutes to a temperature of about 135° C. and Table 1B is a successive productive mixing stage in an internal mixer for about 2 minutes to a temperature of about 95° C. The composition was briefly open mill mixed between the non-productive and productive mixing stages, while allowing the rubber composition to cool to at least 30° C., or lower, before adding to the final, productive mixing stage.

TABLE 1A

| | Non-Productive Mix | | |
|---|---|---|---|
| Material | Parts Exp A (Control) | Parts Exp B | Parts Exp C |
| Natural rubber[1] | 35 | 0 | 0 |
| Chlorobutyl rubber[2] | 60 | 60 | 60 |
| EPDM[3] | 5 | 5 | 5 |
| Synthetic cis 1,4-polyisoprene[4] | 0 | 35 | 20 |
| Trans 1,4-polybutadiene | 0 | 0 | 15 |
| Clay | 55 | 55 | 55 |
| Titanium dioxide | 45 | 45 | 45 |
| Processing aids | 7.5 | 7.5 | 7.5 |
| Stearic acid | 1 | 1 | 1 |

TABLE 1B

|  | Productive Mix | | |
|---|---|---|---|
| Material | Parts Exp A (Control) | Parts Exp B | Parts Exp C |
| Zinc oxide | 5 | 5 | 5 |
| Antioxidant | 1 | 1 | 1 |
| Sulfur | 1.2 | 1.2 | 1.2 |
| Accelerators | 1.9 | 1.9 | 1.9 |

The processing aids were used as waxes and rubber processing oil; the antioxidant as of the phenolic type and accelerators of the sulfenamide type.
1. Natural cis 1,4-polyisoprene rubber;
2. Chlorobutyl rubber obtained as Chlorobutyl HT-1066 from the Exxon Chemical Company;
3. Ethylene/propylene/non-conjugated diene terpolymer obtained as Royalene 301T from the Uniroyal Chemical Company;
4. Synthetic cis 1,4-polyisoprene obtained as NAT 2200 from The Goodyear Tire & Rubber Company.

The trans 1,4-polybutadiene for this example had a microstructure as a trans 1,4-content of about 80 percent, a cis 1,4-content of about 5 percent and a vinyl 1,2-content of about 15 percent. It was further characterized by having a number average molecular weight (Mn) of about 205,000 (plus or minus about 10 percent) as may be determined by, for example, by gel permeation chromatography (GPC) and a weight average molecular weight (Mw) of about 430,000 (plus or minus about 13,000) as may be determined by, for example, by GPC. It was additionally characterized by having a Tg of about −75° C. and softening points of about 40° C. (major) and 60° C. (minor). Both the Tg and Tm were determined by differential scanning calorimeter at 10° C. rise per minute.

Such trans 1,4-polybutadiene can be suitably prepared, for example, by batch polymerizing 1,3-butadiene in an aliphatic hydrocarbon solution (e.g. hexane) in the presence of a catalyst of cobalt octoate and triethylaluminum with p-dodecylphenol modifier, although it can also be prepared by continuous polymerization with a suitable gel inhibitor.

EXAMPLE II

The prepared rubber compositions of Example I were cured at a temperature of about 150° C. for about 18 minutes and the resulting cured rubber samples evaluated for their physical properties as shown in the following Table 2. The experimental samples A, B and C correspond to the experimental samples A, B and C of Example I.

TABLE 2

| Properties | Exp A (Control) | Exp B | Exp C |
|---|---|---|---|
| Rheometer (150° C.) | | | |
| (a) Max torque (dN-m) | 23.4 | 20.5 | 23.8 |
| (b) Min torque (dN-m) | 4.5 | 4.5 | 4.5 |
| Stress-Strain | | | |
| (a) 300% Modulus (MPa) | 4.4 | 2.8 | 2.9 |
| (b) Tensile strength MPa | 8.5 | 7.3 | 6.1 |
| (c) Elongation (%) | 597 | 665 | 636 |
| Hardness, 23° C. | 54 | 49 | 52 |
| Rebound %, 23° C. | 29.5 | 24 | 26.5 |

TABLE 2-continued

| Properties | Exp A (Control) | Exp B | Exp C |
|---|---|---|---|
| Monsanto fatigue to failure (min) | 139 | 196 | 232 |
| Tabor abrasion (cc loss) | 1.5 | 1.74 | 1.58 |
| Green strength (MPa) | | | |
| @ 50% elongation | 0.5 | 0.44 | 1.1 |
| @ 100% elongation | 0.54 | 0.47 | 1.29 |
| @ 200% elongation | 0.57 | 0.45 | 1.83 |

The Tabor abrasion test is a well known test which measures rubber abraded away from the cured rubber sample in terms of cubic centimeter loss and the green strength is simply a measure of force to stretch an uncured rubber sample.

The Rheometer test reports torque applied by an oscillating disk to uncured rubber samples which cures during the test. The stress-strain values are determined by conventional means. The fatigue-to-failure values are for the time to failure of a cured rubber strip while experiencing continuous flexing.

For this Example, in a blend of natural rubber, chlorobutyl rubber and EPDM, a replacement of natural rubber (used in Exp A) with synthetic cis 1,4-polyisoprene (as specified in Exp B) was observed to cause a reduction of cured modulus, hardness and rebound and an increase of abrasion loss. In addition, the green strength of the uncured rubber composition of Exp B is observed to be lower than the Control rubber composition of Exp A.

In contrast, the replacement of natural rubber (specified by the Exp A Control) with trans 1,4-polybutadiene and synthetic cis 1,4-polyisoprene (the subject of this invention and as demonstrated as Exp C) was observed to cause an improvement in cured modulus, hardness and rebound when compared to Exp B which contained only synthetic cis 1,4-polyisoprene as a replacement for natural rubber. Also, abrasion resistance and fatigue-to-failure was observed to be improved as compared to Exp. B as well as improved green strength.

Therefore, the combination of trans 1,4-polybutadiene and synthetic cis 1,4-polyisoprene rubber was observed to be an excellent candidate for replacement of natural cis 1,4-polyisoprene itself in white sidewall rubber compositions.

In particular, it has been observed for the white sidewall composition, that the combination of the specified and microstructure characterized trans, 1,4-polybutadiene together with the synthetic cis 1,4-polyisoprene rubber played a significant role in providing properties similar to or better than the properties imparted by natural cis 1,4-polyisoprene rubber and to thereby enable the replacement of, or the substantial replacement of, natural cis 1,4 polyisoprene in a rubber composition.

EXAMPLE III

In this Example, the addition of from 5 to 25 phr trans 1,4-polybutadiene to 25 phr (Exp D, E, F) as a replacement for synthetic cis 1,4-polyisoprene is observed to show a dramatic improvement in green strength and an increase of modulus and rebound.

White colored rubber compositions of diene rubbers, devoid of carbon black reinforcement and containing silica and titanium dioxide, with relatively small amounts of trans 1,4-polybutadiene having two softening points of about 40° C. (major) and about 60° C. (minor) were prepared, similar to Example I, comprised of the following recipe shown in Table 3 as Experiments D, E, F and G. Experiment D is considered a control since it contained only synthetic cis 1,4-polyisoprene with the chlorobutyl rubber and EPDM rubbers.

TABLE 3A

Non-Productive Mix

| Material | Parts Exp D | Parts Exp E | Parts Exp F | Parts Exp G |
|---|---|---|---|---|
| Chlorobutyl rubber | 60 | 60 | 60 | 60 |
| EPDM | 5 | 5 | 5 | 5 |
| Synthetic cis 1,4-polyisoprene | 35 | 30 | 20 | 10 |
| Trans 1,4-polybutadiene | 0 | 5 | 15 | 25 |
| Titanium dioxide | 45 | 45 | 45 | 45 |
| Processing aids | 7.5 | 7.5 | 7.5 | 7.5 |
| Stearic acid | 1 | 1 | 1 | 1 |

TABLE 3B

Productive Mix

| Material | Parts Exp D | Parts Exp E | Parts Exp F | Parts Exp G |
|---|---|---|---|---|
| Zinc oxide | 5 | 5 | 5 | 5 |
| Antioxidant | 1 | 1 | 1 | 1 |
| Sulfur | 1.44 | 1.44 | 1.44 | 1.44 |
| Accelerators | 2.71 | 2.71 | 2.71 | 2.71 |

EXAMPLE IV

The prepared rubber compositions of Example III were cured at a temperature of about 150° C. for about 18 minutes and the resulting cured rubber samples evaluated for their physical properties as shown in the following Table 4.

TABLE 4

| Properties | Exp D | Exp E | Exp F | Exp G |
|---|---|---|---|---|
| Rheometer (150° C.) | | | | |
| (a) Max Torque | 22.9 | 23.5 | 23.8 | 25.2 |
| (b) Min Torque | 4.6 | 4.9 | 5.6 | 6.3 |
| Stress-strain | | | | |
| (a) 300% modulus (MPa) | 2.6 | 2.8 | 2.8 | 2.6 |
| (b) Tensile strength (MPa) | 9.2 | 8.6 | 7.4 | 7.8 |
| (c) Elongation (%) | 725 | 680 | 600 | 620 |
| Rebound %, 23° C. | 24.5 | 26.0 | 25.0 | 24.5 |
| Green strength (MPa) | | | | |
| @ 50% strain | 0.23 | 0.44 | 0.78 | 0.85 |
| @ 100% strain | 0.25 | 0.51 | 0.96 | 1.07 |
| @ 200% strain | 0.23 | 0.90 | 1.17 | 1.31 |

EXAMPLE V

In this Example, the recipe of Exp E of Example III (repeated herein as Exp H) is modified to include 10 phr silica (Exp I) together with 0.5 (1.0/2) phr of coupling agent as shown in the following Tables 4A and 4B.

TABLE 4A

Non-Productive Mix

| Material | Parts Exp H (Control) | Parts Exp I |
|---|---|---|
| Chlorobutyl rubber | 60 | 60 |
| EPDM | 5 | 5 |
| Synthetic cis 1,4-polyisoprene | 35 | 30 |
| Trans 1,4-polybutadiene | 0 | 5 |
| Silica[1] | 0 | 10 |
| Clay | 55 | 45 |
| Titanium dioxide | 45 | 45 |
| Processing aids | 7.5 | 7.5 |
| Stearic acid | 1.0 | 1.0 |
| Coupling agent[2] | 0 | 1.0 |

TABLE 4B

Productive Mix

| Material | Parts Exp D (Control) | Parts Exp E |
|---|---|---|
| Zinc oxide | 5 | 5 |
| Antioxidant | 1 | 1 |
| Sulfur | 1.44 | 1.44 |
| Accelerators | 2.71 | 2.71 |

1. A silica obtained as Hi-Sil 210 from the PPG company.
2. A bis-3-(triethoxysilylpropyl) tetrasulfide available as Si69 from Degussa.

EXAMPLE VI

The prepared rubber compositions of Example V were cured at a temperature of about 150° C. for about 18 minutes and the resulting cured rubber samples evaluated for their physical properties as shown in the following Table 5.

TABLE 5

| Properties | Exp I (Control) | Exp J |
|---|---|---|
| Rheometer (150° C.) | | |
| (a) Max Torque (dN-m) | 22.9 | 30.3 |
| (b) Min Torque (dN-m) | 4.6 | 6.9 |
| Stress-strain | | |
| (a) 300% modulus (MPa) | 2.4 | 4.7 |
| (b) Tensile strength (MPa) | 8.2 | 7.6 |
| (c) Elongation (%) | 740 | 515 |
| Rebound, 23° C. | 24.5 | 27.0 |
| Tabor abrasion (cc) | 1.49 | 1.03 |
| Green strength (MPa) | | |
| @ 50% elongation | 0.23 | 0.58 |
| @ 100% elongation | 0.25 | 0.71 |
| @ 200% elongation | 0.23 | 0.93 |

This Example demonstrates that the cured elastomer modulus, rebound and abrasion properties as well as the uncured composition green strength benefited from utilization of the combination of silica inclusion with the elastomer combination of synthetic cis 1,4-polyisoprene rubber and the trans 1,4-polybutadiene.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a rubber sidewall composed of a carbon black reinforced rubber composition wherein said sidewall also has, at least a portion of its outer surface, a white rubber composition devoid of carbon black reinforcement, wherein said white sidewall composition is comprised of, based on 100 parts by weight rubber (phr), (1) a combination of elastomers consisting essentially of (A) about 5 to about 30 phr of a trans 1,4-polybutadiene polymer, (B) about 10 to about 50 phr of synthetic cis 1,4-polyisoprene rubber (C) about 40 to about 70 phr of chlorobutyl rubber and (D) about 2 to about 15 phr of EPDM as a terpolymer rubber of about 70 to about 25 percent units derived from ethylene, about 28 to about 75 percent units derived from propylene and about 2 to about 15 percent units derived from a non-conjugated diene and (2) about 10 to about 55 phr of titanium dioxide; wherein said trans 1,4-polybutadiene polymer is characterized by having at least a trans 1,4-content within a range of about 60 to about 90 percent and at least one melting point within a range of about 20° C. to about 60° C.

2. The tire of claim 1 wherein, for said white sidewall composition, said trans 1,4-polybutadiene polymer has a microstructure of about 75 to about an 85 percent of its butadiene repeat units of a trans 1,4-isomeric structure, about 2 to about 18 percent of its units of a vinyl 1,2-structure and about 2 to about 18 percent of its units of a cis 1,4-structure and, in its uncured state, and at least one melting point in a range of 35° C. to about 60° C.

3. The tire of claim 2, wherein, for said white sidewall composition, the trans 1,4-polybutadiene polymer exhibits a first major melting point in a range of about 35° C. to about 45° C. and a second minor melting point in a range of about 55° C. to about 65° C.

4. The tire of claim 1 where, for said white sidewall composition, titanium dioxide is the primary colorant.

5. The tire of claim 1 where said white sidewall composition is exclusive of natural cis 1,4-polyisoprene.

6. The tire of claim 1 where, for said white sidewall composition, said synthetic cis 1,4-polyisoprene is characterized by having a Tg within a range of about −70° C. to about −80° C.

7. The tire of claim 1 where said white sidewall composition contains at least one additional rubber in an amount of about 2 to about 15 phr selected from at least one of cis 1,4-polybutadiene rubber, styrene/butadiene copolymer rubber, isoprene/butadiene copolymer rubber and styrene/isoprene/butadiene terpolymer rubber.

8. The tire of claim 7 where, for said white sidewall composition, said additional rubber is selected from at least one of the group consisting of cis 1,4-polybutadiene rubber and styrene/butadiene copolymer rubber.

9. The tire of claim 1 where said white sidewall composition contains about 2.5 to about 15 phr of precipitated silica.

10. The tire of claim 9 where said white sidewall composition also contains a silica coupler having a silane moiety reactive with silanol groups associated with the silica and another polysulfide moiety interactive with at least one elastomer in said white sidewall composition; wherein said polysulfide moiety is a polysulfide bridge containing from about 2 to about 6 sulfur atoms.

* * * * *